(12) United States Patent
Roess et al.

(10) Patent No.: US 9,795,094 B2
(45) Date of Patent: Oct. 24, 2017

(54) IRRIGATION MAT

(75) Inventors: Thomas H. Roess, Twistringen (DE); Todd D. Polderman, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 307 days.

(21) Appl. No.: 13/597,211

(22) Filed: Aug. 28, 2012

(65) Prior Publication Data
US 2013/0075490 A1    Mar. 28, 2013

(30) Foreign Application Priority Data

Sep. 26, 2011 (DE) .......... 10 2011 114 238
Sep. 29, 2011 (DE) .......... 10 2011 083 742
Oct. 13, 2011 (DE) .......... 10 2011 084 468

(51) Int. Cl.
*A01G 25/00* (2006.01)
*A01G 25/06* (2006.01)

(52) U.S. Cl.
CPC ................... *A01G 25/06* (2013.01)

(58) Field of Classification Search
CPC ...... A01G 25/00; A01G 25/02; A01G 25/023; A01G 25/06; A01G 13/0281; A01G 29/00
USPC .... 47/48.5, 79, 21.1, 9, 62 E; 239/145, 450; 405/45, 36, 43
See application file for complete search history.

(56) References Cited

U.S. PATENT DOCUMENTS

| | | | |
|---|---|---|---|
| 1,389,319 A | 8/1921 | Quigley | |
| 3,205,619 A | 9/1965 | Henry | |
| 3,361,359 A | 1/1968 | Chapin | |
| 3,946,762 A * | 3/1976 | Green | 405/45 |
| 4,062,306 A | 12/1977 | Wosmek | |
| 5,246,164 A | 9/1993 | McCann et al. | |
| 5,263,791 A | 11/1993 | Zeman | |
| 5,839,659 A | 11/1998 | Murray | 239/1 |
| 5,938,372 A * | 8/1999 | Lichfield | 405/38 |
| 6,161,776 A | 12/2000 | Byles | |
| 6,996,932 B2 * | 2/2006 | Kruer et al. | 47/48.5 |
| 7,392,614 B2 | 7/2008 | Kruer et al. | 47/48.5 |
| 7,647,724 B2 | 1/2010 | Caron et al. | 47/1.01 |
| 8,770,888 B2 * | 7/2014 | Helbig et al. | 405/37 |
| 2006/0201061 A1 | 9/2006 | Caron et al. | 47/79 |

(Continued)

FOREIGN PATENT DOCUMENTS

| | | |
|---|---|---|
| AU | 627697 | 3/1989 |
| CH | 542571 | 10/1973 |

(Continued)

OTHER PUBLICATIONS

German Patent Office Examination Report from German Counterpart Patent Application No. 10 2011 083 742.6 (4 pages).

(Continued)

*Primary Examiner* — Trinh Nguyen

(74) *Attorney, Agent, or Firm* — Knobbe Martens Olson & Bear, LLP

(57) ABSTRACT

The disclosure includes various embodiments of an irrigation mat. In some embodiments, the mat is generally installed so that plants meet the layer of moisture formed by a nonwoven textile web in a relatively short time due to growth of roots. Some embodiments include a web where the roots of plants can grow into the web and thus those plants can be supplied with moisture.

20 Claims, 7 Drawing Sheets

(56) References Cited

U.S. PATENT DOCUMENTS

| | | | |
|---|---|---|---|
| 2008/0271366 A1* | 11/2008 | Thompson et al. | 47/9 |
| 2008/0282609 A1 | 11/2008 | Nelson | |
| 2009/0134242 A1 | 5/2009 | Theoret et al. | 239/201 |
| 2010/0251612 A1 | 10/2010 | Gesser et al. | |
| 2010/0282859 A1 | 11/2010 | Helbig et al. | 239/11 |
| 2012/0111972 A1 | 5/2012 | Theoret et al. | 239/201 |

FOREIGN PATENT DOCUMENTS

| | | | | |
|---|---|---|---|---|
| DE | 2610384 | 9/1976 | | |
| DE | 3041534 | 6/1982 | | |
| DE | 10118643 | 10/2002 | | |
| EP | 18234 | 10/1980 | | |
| EP | 155143 | 9/1985 | | |
| EP | 1 430 770 A1 | 6/2004 | | A01G 13/02 |
| EP | 0969151 B1 | 7/2004 | | |
| FR | 2323317 | 4/1977 | | |
| FR | 2331953 A2 | 6/1977 | | |
| FR | 2387582 | 11/1978 | | |
| FR | 2473262 | 7/1981 | | |
| WO | WO 2009/015911 A2 | 2/2009 | | A01G 25/06 |

OTHER PUBLICATIONS

Written Opinion from PCT Counterpart Patent Application No. PCT/EP2012/068929.

\* cited by examiner

IRRIGATION MAT

PRIORITY CLAIM

This application claims a priority benefit under 35 U.S.C. §119 from German Patent Application Serial Numbers:

| | | |
|---|---|---|
| DE 10 2011 114 238.3 | filed on Sep. 26th, 2011, | titled, "Irrigation Mat," |
| DE 10 2011 083 742.6 | filed on Sep. 29th, 2011, | titled, "Irrigation Mat," and |
| DE 10 2011 084 468.6 | filed on Oct. 13th, 2011, | titled, "Irrigation Mat." |

Each application is incorporated by reference herein.

FIELD OF THE DISCLOSURE

The present disclosure relates to the field of irrigation. More specifically, the disclosure relates to irrigation mats.

BACKGROUND OF THE DISCLOSURE

The disclosure concerns an irrigation mat. Examples of irrigation mats are already known in many different forms from the state of the art, for example from U.S. Pat. No. 5,839,659, DE 101 18 643 B4, WO 2009/015911 or CH 542 571, all of which are incorporated by reference herein in their entirety.

In the solutions known from those documents an irrigation tube having a plurality of openings is surrounded by at least two nonwoven textile layers or nonwoven textile webs and the individual nonwoven textile webs are joined together, for example by being sewn together, by quilting, stitching or interlinking so that the irrigation tube comes to bear between the two different nonwoven textile webs upon and after laying of the irrigation mat.

When water is pushed through such an irrigation tube, water issues through the openings in the tube and is distributed in the two nonwoven textile webs, which by virtue of their capillarity also regularly transport the water away from the irrigation tube into the plane of the nonwoven textile webs.

SUMMARY OF THE DISCLOSURE

Embodiments of the present disclosure include a low cost textile irrigation mat. Low cost can be attained by a textile irrigation mat that only comprises one nonwoven textile web and the irrigation tube is fixed to that one nonwoven textile web. In various embodiments, a mesh can serve for fixing purposes, the irrigation tube can be wrapped into the nonwoven textile web, or the irrigation tube can be sewn or glued to the nonwoven textile web, or other constructions recognizable to an artisan from the disclosures herein.

In one respect it is entirely possible for the irrigation tube itself to be covered by a nonwoven textile, for example a sheath of textile fabric, in order thereby to prevent the roots from growing into the holes/perforations of the irrigation tube.

Various different configurations of the irrigation mat according to the disclosure are set forth hereinafter.

For purposes of summarizing the disclosure, certain aspects, advantages and novel features of the disclosure have been described herein. Of course, it is to be understood that not necessarily all such aspects, advantages or features will be embodied in any particular embodiment of the disclosure.

BRIEF DESCRIPTION OF THE DRAWINGS

The following drawings and the associated descriptions are provided to illustrate embodiments of the present disclosure and do not limit the scope of the claims.

DETAILED DESCRIPTION OF THE PREFERRED EMBODIMENT

In the interest of clarity, it may be that not all features of an actual implementation are described in this specification. It will of course be appreciated that in the development of any such actual implementation (as in any development project), numerous implementation-specific decisions must be made to achieve the developers' specific goals and sub-goals, such as compliance with system- and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

To facilitate a complete understanding of the disclosure, the remainder of the detailed description describes the disclosure with reference to the drawings, wherein like reference numbers are referenced with like numerals throughout.

Figure 1A:
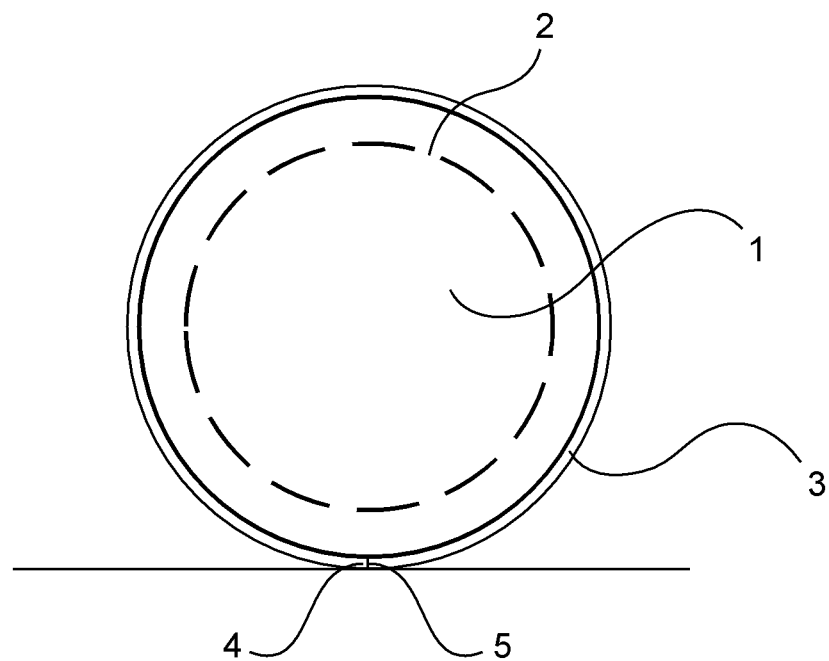
FIG. 1 shows exemplary cross-sectional views of an irrigation tube, according to an embodiment of the disclosure.
Figure 1B:
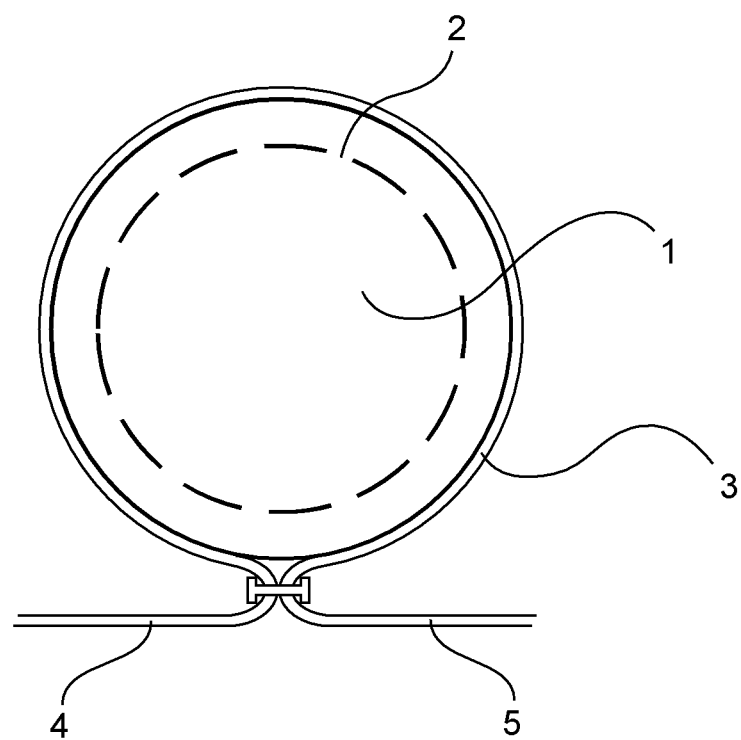

FIG. 1 is a cross-sectional view showing an irrigation tube 1 having a plurality of bores/openings/perforations which are disposed either in the length thereof and if required also radially. Those perforations 2 are intended to provide that water which passes into the irrigation tube 1 issues outwardly through the perforation.

In the illustrated example the irrigation tube is wrapped in a single nonwoven textile web 3 so that the irrigation tube is surrounded practically over its entire periphery, that is to say over 360°, by the nonwoven textile web 3 and, where the two ends 4 and 5 of the nonwoven textile web 3 come into contact with each other, the nonwoven textile web ends are joined together, for example by stitching, clamping or gluing.

Figure 2:
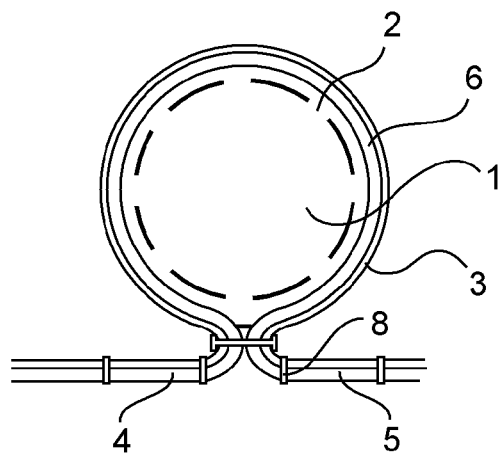
FIG. 2 shows the cross-sectional view of the tube of FIG. 1 and a casing, according to an embodiment of the disclosure.

FIG. 2 shows a variant of the structure shown in FIG. 1, in which case the irrigation tube is surrounded by a casing which for example comprises textile fabric or nonwoven textile so that the nonwoven textile web 3 touches the casing 6 and bears (snugly) thereagainst. For further making the connection between the nonwoven textile web 3 and the casing 6 it can in turn be fixedly joined at the appropriate locations by seams 8. Gluing or clamping at those locations is also possible to optimize the contact between and the join between the casing 6 and the nonwoven textile web 3.

Figure 3:
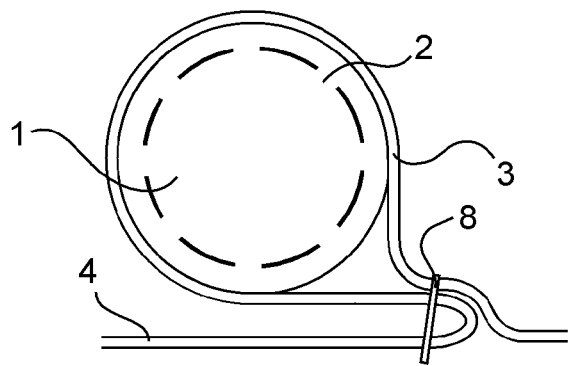
FIG. 3 shows the cross-sectional view of the tube of FIG. 1 in which the nonwoven textile web forms in cross-section a loop, according to an embodiment of the disclosure.

FIG. 3 shows a further variant according to FIG. 1, in which the nonwoven textile web forms in cross-section a loop into which the irrigation tube is introduced, wherein the loop is sewn by way of a seam 8 in order thereby to firmly hold the irrigation tube 1 in the nonwoven textile web.

Figure 4:
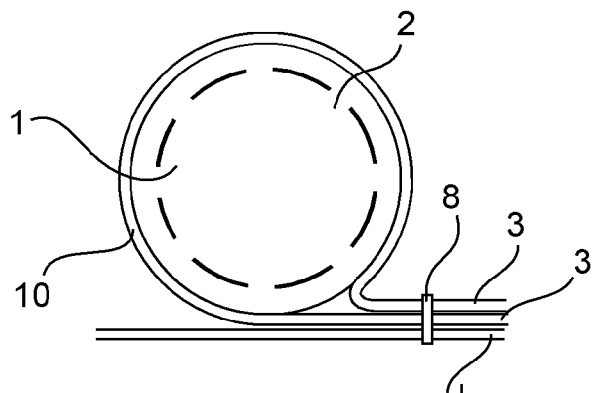
FIG. 4 shows the cross-sectional view of the tube of FIG. 3 where the loop is then fixed to a nonwoven textile layer, according to an embodiment of the disclosure.

FIG. 4 shows a variant in which an individual nonwoven textile web loop 10 is formed, into which the irrigation tube 1 is introduced and that loop 10 is then fixed to the nonwoven textile layer 3 which is laid out flat, for example by stitching, quilting, gluing and so forth.

Figure 5:
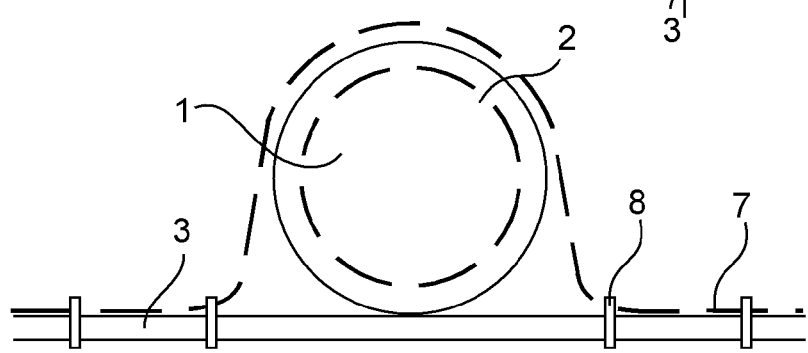
FIG. 5 shows the cross-sectional view of the tube of FIG. 1 placed on a nonwoven textile web and fixed on a nonwoven textile web by a mesh, according to an embodiment of the disclosure.

FIG. 5 shows a further variant in which the irrigation tube 1 is placed on the nonwoven textile web 3 and fixed on the nonwoven textile web 3 by a mesh 7 comprising for example plastic. The mesh 7 itself does not have any capillary structure but is of a very coarse-mesh nature and serves solely for fixing the tube to the nonwoven textile web which in turn has a good to very good capillary action.

Figure 6:
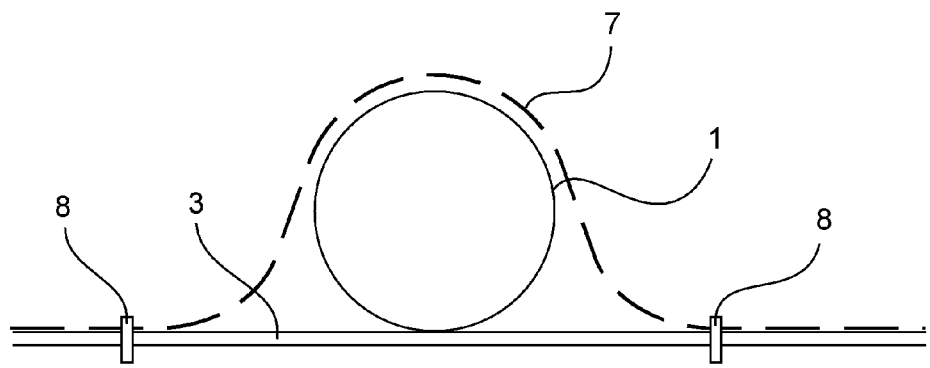
FIG. 6 shows the cross-sectional view of the tube of FIG. 1 in which a strip of the mesh material is placed over the tube and is joined to a nonwoven textile web on both sides, according to an embodiment of the disclosure.

While in FIG. 5 the mesh 7 is laid out over the nonwoven textile web 3 over the entire surface area and is joined in that situation to the nonwoven textile web, for example by stitching, gluing and so forth, FIG. 6 shows a variant in which only a strip of the mesh material 7 is placed over the irrigation tube 1 and joined on both sides of the irrigation tube to the nonwoven textile web 3 in order thereby to fix the irrigation tube on the nonwoven textile web.

Figure 7:
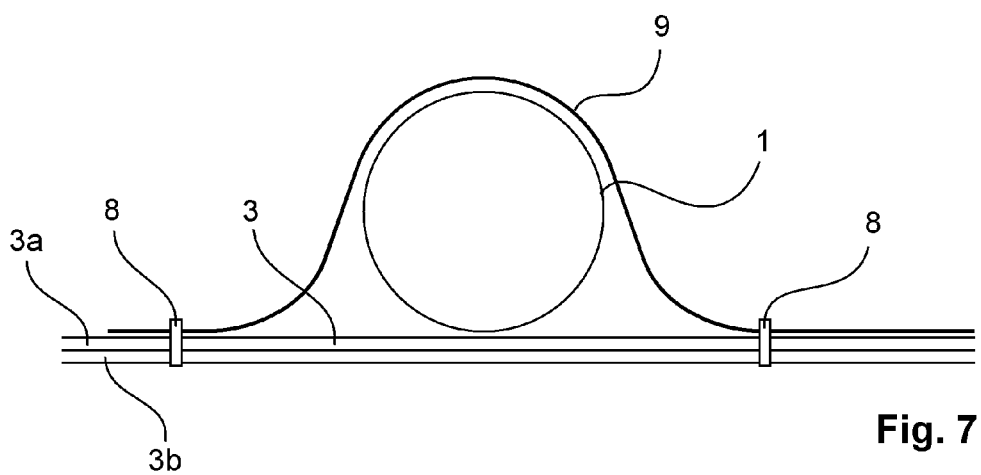
FIG. 7 shows the cross-sectional view of the tube of FIG. 1 in which another material is placed over the tube and is joined to a nonwoven textile web on both sides, according to an embodiment of the disclosure.

FIG. 7 shows a further variant of the disclosure in which, instead of a mesh, another material which does not have a capillary action is placed over the tube, and covers same, so that the web of material is joined to the nonwoven textile web on both sides of the tube.

In the aforementioned variants the irrigation tube is always above the nonwoven textile web. In the specified variants the sequence can also be reversed so that therefore in that case the nonwoven textile web lies above the irrigation tube and thus the nonwoven textile web itself affords protection against the penetration of roots into the perforations in the irrigation tube.

In all the aforementioned variants, as already shown in FIG. 2, it is also possible for the irrigation tube 1 itself to be surrounded by a casing 6 which comprises for example nonwoven textile, cotton or other water-conductive textiles, in particular also water-conductive textiles which ensure optimum water distribution over the periphery of the irrigation tube and which preferably have a high capillary capability so that this affords optimum natural distribution of water in the casing 6 of the irrigation tube so that the water can be passed from there in the best possible fashion into the single nonwoven textile web 3.

Figure 8:
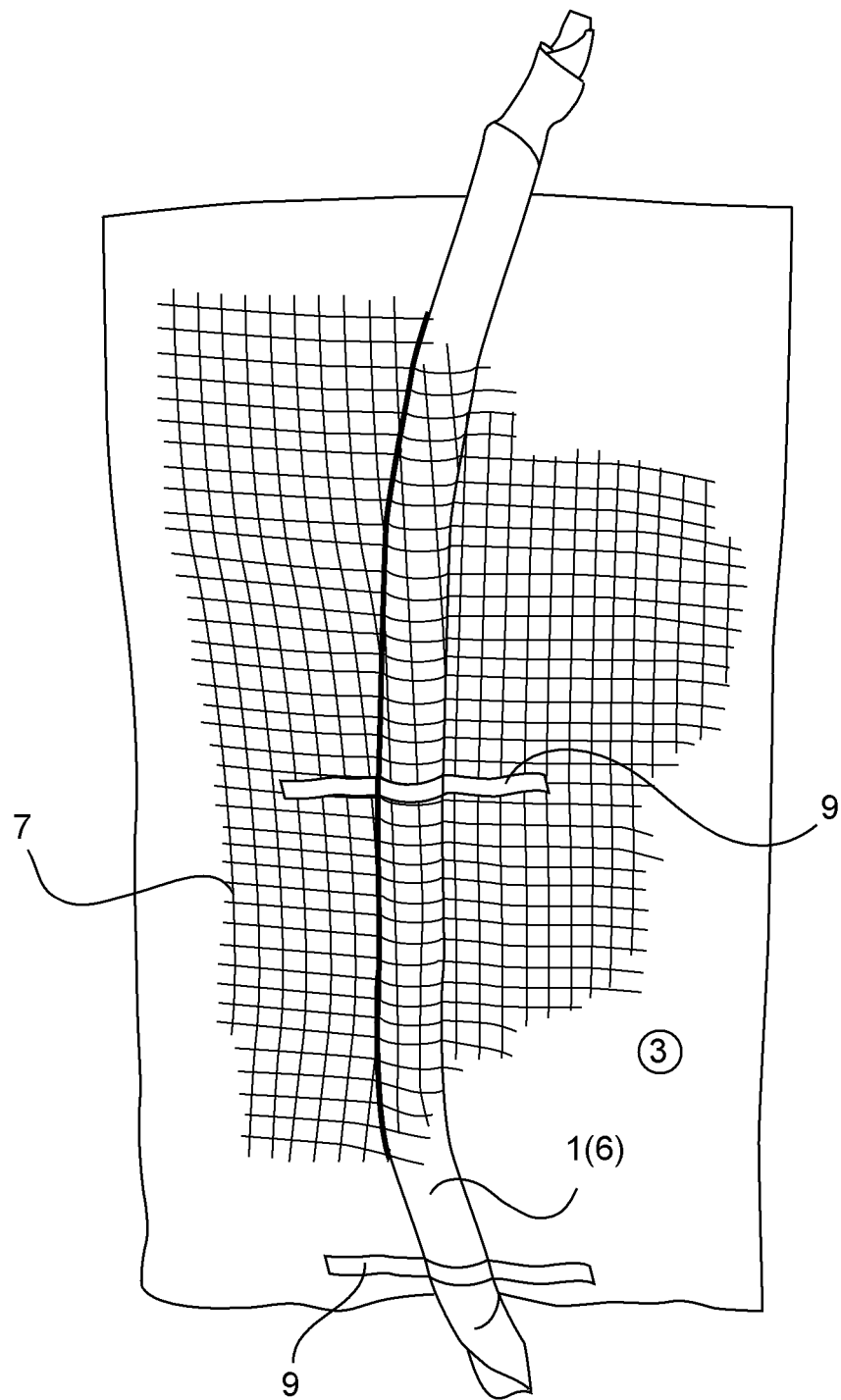
FIG. 8 shows a plan view of the tube of FIG. 5 and adhesive strips for further fixing the tube to a nonwoven textile web, according to an embodiment of the disclosure.

FIG. 8 shows a plan view of the variant in FIG. 5. In this respect the irrigation tube itself is also provided with a casing comprising a textile material which has a high capillarity.

FIG. 8 also shows that if desired, adhesive strips 9 can be provided for further fixing the irrigation tube to the nonwoven textile web.

Figure 9:
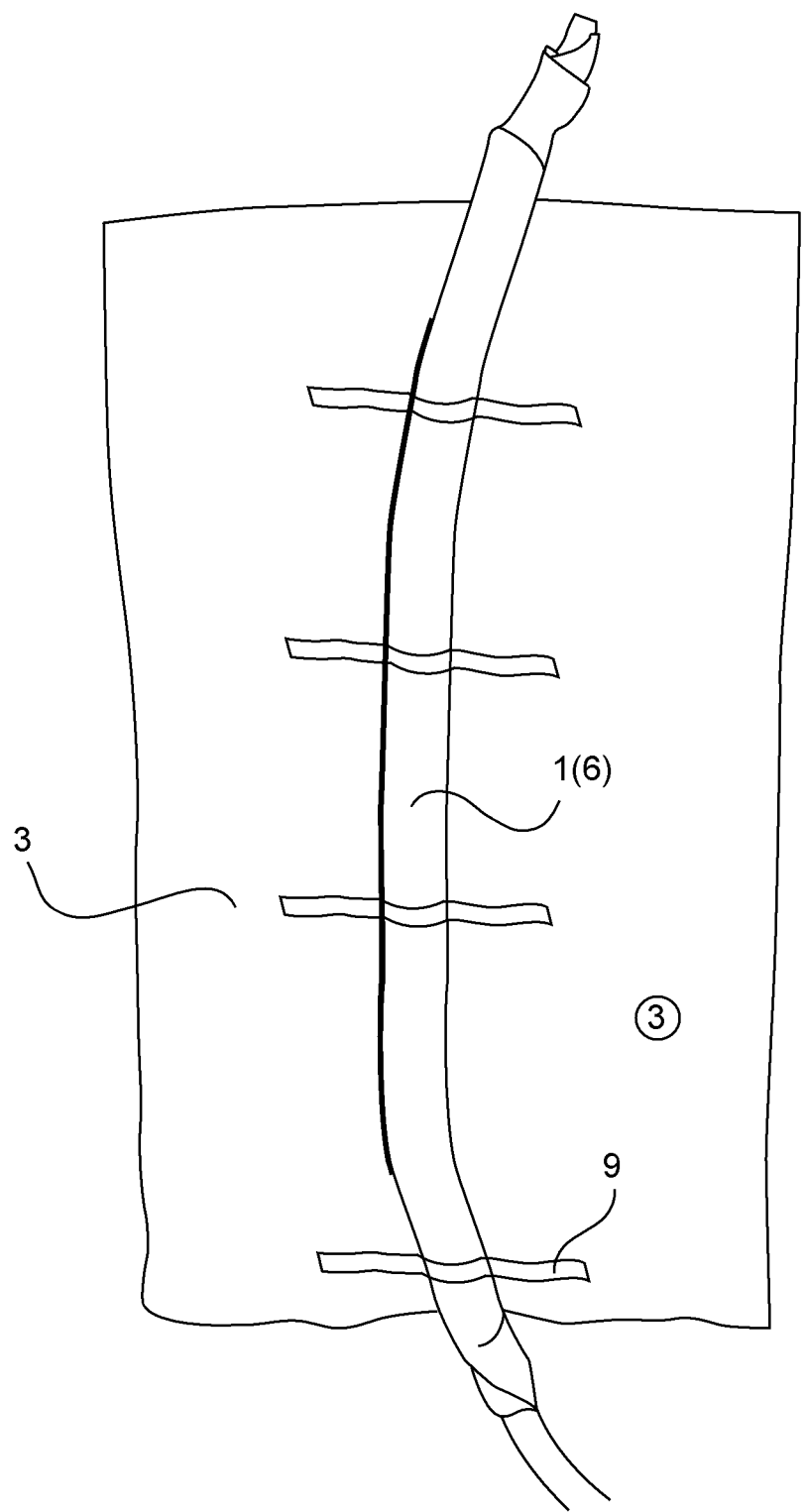
FIG. 9 shows a plan view of the tube of FIG. 8 without a mesh covering, according to an embodiment of the disclosure.

FIG. 9 shows a variant in accordance with FIG. 8 without a mesh covering. It can be clearly seen there that the water issuing from the irrigation tube 2 penetrates into the nonwoven textile web 3 and is distributed far beyond the diameter of the irrigation tube 1.

Figure 11:
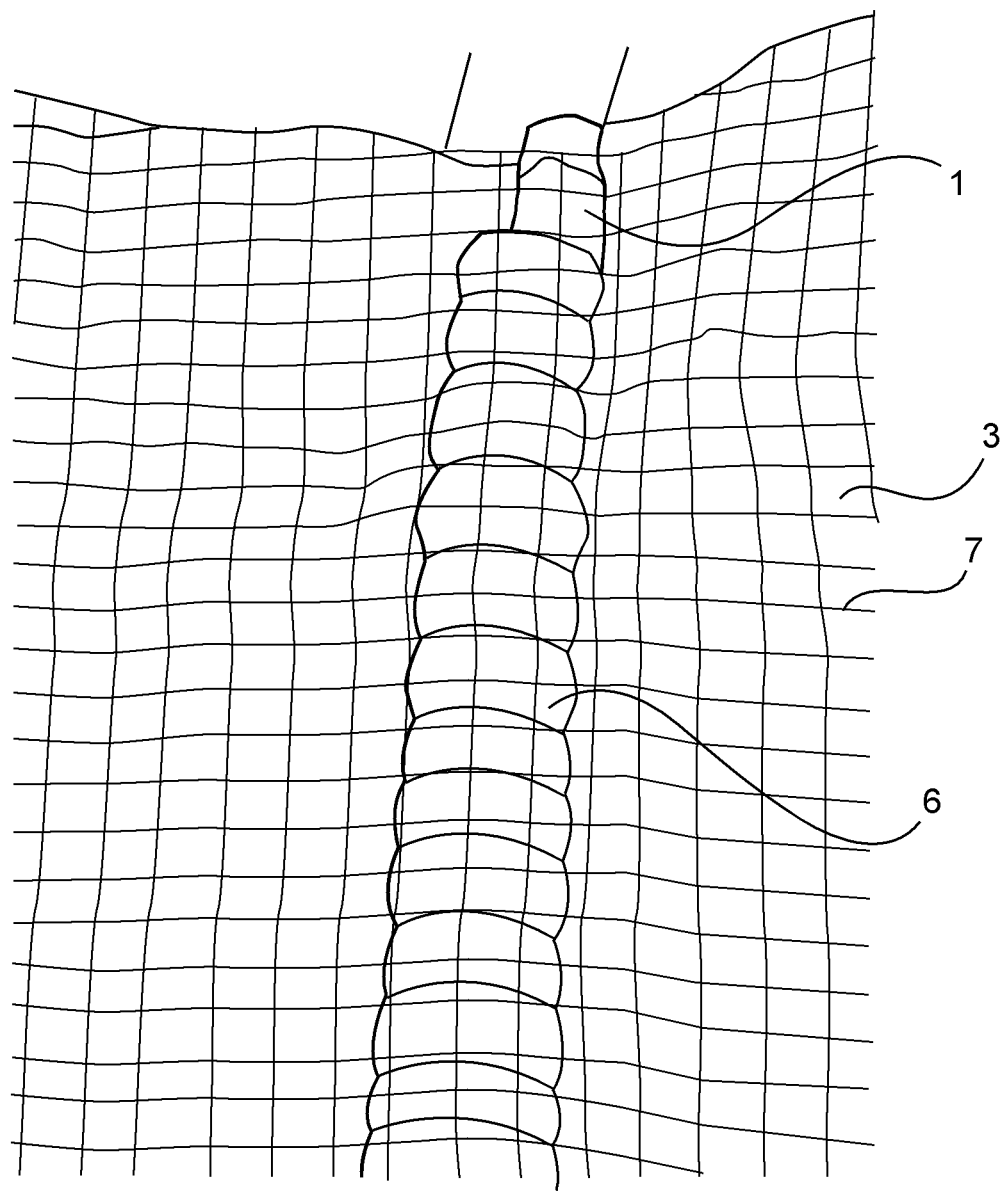
FIG. 11 shows a plan view of the tube of FIG. 5 and a casing placed under a nonwoven textile web, according to an embodiment of the disclosure.

FIG. 11 shows a plan view of the variant according to the disclosure as shown in FIG. 5. It can be seen there that an irrigation tube 1 which has a casing 6 is placed on the nonwoven textile web (underneath) and that structure is fixed by means of a mesh 7 which is sewn to the nonwoven textile web 3 (gluing is also possible). As mentioned it is also possible to glue the irrigation tube 1 (with or without casing) to the nonwoven textile web 3 and the nonwoven textile web itself can also be glued where parts thereof touch each other (for example in accordance with the variants shown in FIGS. 1, 2, 3 and 4). Hot melt adhesives are suitable for that purpose, or also other adhesives, including those adhesives which lose their adhesive effect after a prolonged period of time, which does not give rise to any problem when the irrigation mat has already been laid in the ground and covered by earth.

Figure 12:
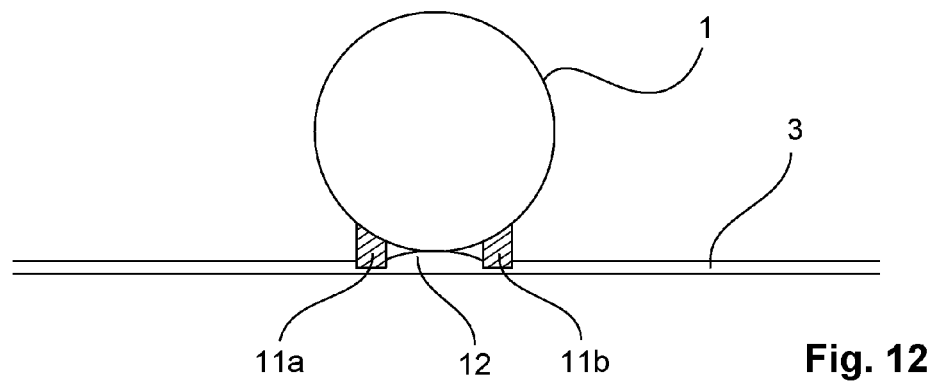
FIG. 12 shows an exemplary cross-sectional view of a tube affixed to the nonwoven textile web, according to an embodiment of the disclosure.

FIG. 12 is a cross-sectional view of an example in respect of which it can be seen that the drip tube (irrigation tube) 1 is glued to the nonwoven textile web 3 (the latter can in turn also comprise a plurality nonwoven textile webs 3a, 3b, 3c . . . , wherein those nonwoven textile webs are joined together). For that purpose there is not only one adhesive strip (which is self-evidently also possible), but two adhesive strips IIa and IIb which are arranged in parallel relationship and between which a strip 12 of nonwoven textile web 3 remains free so that the water can be better discharged from the drip tube into the nonwoven textile web 3. Preferably the nonwoven textile web 3 bears snugly against the drip tube in that region of the strip 3. The two adhesive strips IIa and IIb do not have to be continuous over their entire length but can also have interruptions along their length. Such adhesive strips can be applied in the production process when applying the irrigation tube to the nonwoven textile web 3 by hot melt adhesive from a hot melt adhesive applicator device which extends in the region to the right and the left of the strip 12, and provides for best possible bonding of the drip tube to the nonwoven textile web 3. In the illustrated embodiment in FIG. 12 the drip tube 1 is shown without a casing, however it can also readily have a casing as in the other illustrated embodiments, then the casing of the drip tube is glued to the nonwoven textile web 3.

It is also in accordance with the disclosure for a nonwoven textile web 3 to be used, which has a different capillarity at the top side than at the underside.

The illustrated figures show various variants of the irrigation mat according to the disclosure as such. The drawings do not show the water connections to the tubes and the earth material which is generally put on to the irrigation mat, for example to a depth of 20 to 40 cm in thickness (or more) so that plants, for example grass, flowers etc. which are planted in the earth meet the layer of moisture formed by the nonwoven textile web in a relatively short time due to growth of the roots, and can grow thereinto (if the nonwoven textile web permits the roots to correspondingly grow thereinto) and thus those plants can be supplied with moisture, water, in the best possible way.

It is also possible to embed long-term fertilizer into the nonwoven textile web, the fertilizer breaking down only after several months or years after contact with water in order thereby to supply the plants with suitable nutrients in the best possible fashion.

In comparison with the state of the art the solution according to the disclosure manages just with one single nonwoven textile web whereby the overall production of the irrigation mat according to the disclosure can be markedly more advantageous for, in the variants which are known in the state of the art and which regularly provide at least two nonwoven textile webs, a very high level of material expenditure is necessary and the operation of joining the two nonwoven textile webs in the state of the art also requires the use of special equipment which must be of a correspondingly stable nature (for example very strong and sturdy needles) to ensure the sewing procedure.

As described the irrigation tube itself may also be provided with a casing. Something of that kind is already known for example from WO 2009/015911.

Figure 10:
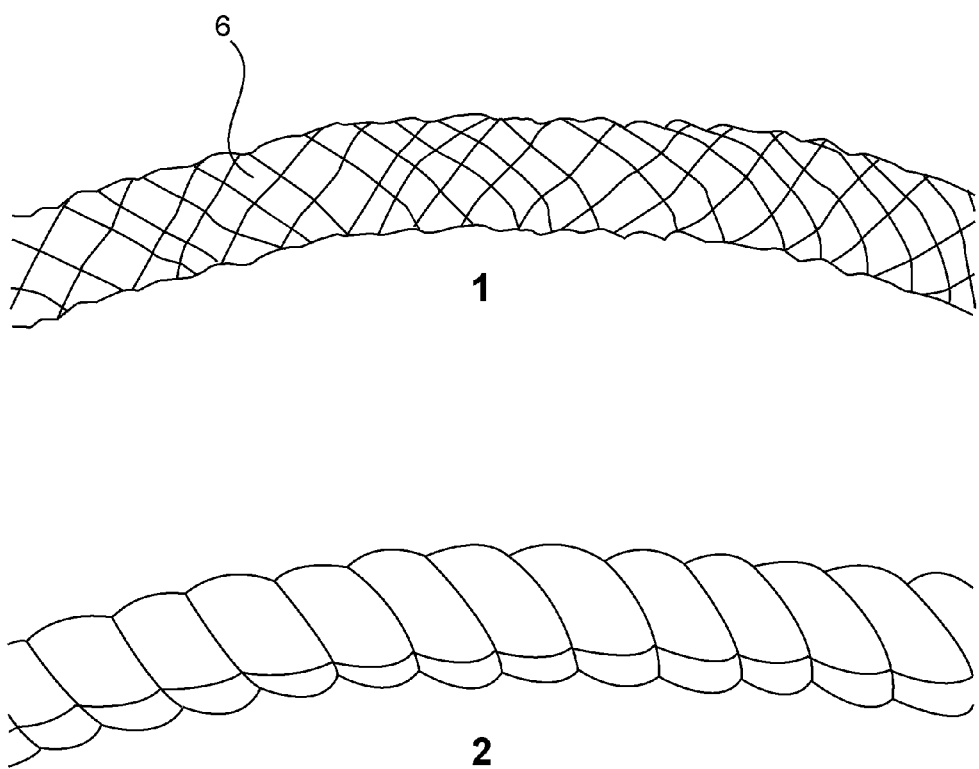
FIG. 10 shows a plan view of the tube of FIG. 1 encased with Kemafil technology, according to an embodiment of the disclosure.

According to the disclosure however it is proposed that, in regard to the casing on the tube, it is wrapped around not only with a textile fabric, nonwoven textile or the like, but that wrapping operation is effected so firmly that the nonwoven textile bears tightly against the tube to ensure more uniform distribution of water along the tube, see FIG. 10 (top).

In that respect 'tight' encasing signifies that, when an irrigation tube of a length of 1 m is hung up vertically and held fast and provided with a tight/snug casing, that casing detaches from the tube only when weights of more than 20 kg, preferably more than 40 kg, are hung on the casing, in which case those weights will try to pull the casing 6 downwardly while the tube 1 itself is hung up fixedly at the top end.

When, as in the state of the art for example in accordance with WO 2009/015911, the irrigation tube is only loosely encased, the encasing nonwoven textile can be relatively easily pulled off the tube, for example by means of a weight applying a pulling force of the order of magnitude of 3 to 5 kg, see FIG. 10 (bottom).

That above-described tube casing, in particular the snug, tight tube casing, is also an independent disclosure which admittedly co-operates well with the described nonwoven textile web solution, but such encased tubes can also be placed individually in the ground in order thereby to permit optimum irrigation of the ground or the plants without in that case roots being able to penetrate into the perforation in the irrigation tube/irrigation hose.

It is particularly advantageous for the tight encasing if the tube is provided on its outside with a cross winding which is shown at the top in FIG. 10.

An irrigation tube which is encased with the 'Kemafil' technology is shown at the bottom in FIG. 10.

The cross winding technology as such is certainly known, for example from the encasing of drainage pipes (for example encasing by means of textile residues, straw, coir fiber and so forth), but the suitability of that cross winding technology for irrigation tubes has hitherto not been described and is thus here novel and in particular inventive because it serves an entirely different purpose from the case in relation to drainage pipes.

Instead of the mesh as shown in the solution illustrated in FIGS. 5, 6 and 8 it is also possible to use a coir mat. Such a coir mat is water-permeable but has (scarcely) no capillary action but represents a capillary barrier. That solution however is certainly possible and is advantageous in particular when the coir mat affords the lowermost layer and the nonwoven textile mat and the coir mat enclose the irrigation tube.

In addition it is also possible in accordance with the disclosure, supplemental to the solutions as shown in FIG. 8 or FIG. 9, for the tubes to be only covered with a film strip (whether they are encased or not). If that product is then laid in such a way that the tube is underneath and the nonwoven textile on top, the film strip which covers the tube prevents the water from being able to pass downwardly; instead the water is pushed into the nonwoven textile and thus the water cannot seep into the ground excessively quickly.

The film strip is preferably water-impermeable and is of a width which is approximately two to five times as great as the tube diameter. In that case the film strip covers the tube along its longitudinal orientation and is preferably fixed to the tube for example by gluing thereto.

As mentioned the drip tube (also referred to as the irrigation hose or irrigation tube in the present application) can be fixed to the nonwoven textile layer/nonwoven textile web 3 by different technologies. A further advantageous option according to the disclosure is that the drip tube is sewn on to the nonwoven textile web, which is possible by means of a cross stitch in which the threads are placed over the tube and alternately repeatedly cross over the tube and are fixed on opposite sides of the tube to the nonwoven textile web and thus enclose the tube and fix it to the nonwoven textile web.

It is also possible, and this can represent an independent solution according to the disclosure, for the drip tube to be fixed to the nonwoven textile by means of a hook-and-loop strip if the one hook-and-loop strip component is fixed to the nonwoven textile itself (for example the component with the hooks) so that then the hook-and-loop strip which has the other hook-and-loop component is fixed thereto.

In regard to the casing on the drip tubes it is also in accordance with the idea of the disclosure that the casing itself is formed from a capillary material, that is to say a material (nonwoven material) which has a high capillary capability in order to achieve good distribution of water along the tube. The irrigation mat according to the disclosure can be well used at installation depths of between 2 cm and 40 cm, wherein about 1 cm to 10 cm suffice when used as a roof greening mat and about 5 cm to 40 cm are advantageous when soil or the like is applied to the mat.

In the foregoing part of the description the nonwoven textile web 3 was presented as a single-layer web. According to the disclosure it is also possible for the nonwoven textile web 3 to be formed by two or three or more mutually superposed nonwoven textile webs 3*a*, 3*b* (see for example FIG. 7), in which respect in such a case it is particularly advantageous if the webs have a different capillary capability in order in that way to adjust the distribution of water in a desired fashion. If the (two) mats are to form a single mat then the (two) mats are again joined together, for example by stitching, gluing, quilting, needling and so forth and the irrigation tube/drip tube is fitted at one side (top or bottom) of one of the (two) mats, but is not between the mats.

It is however also possible that, in the case of an irrigation mat having a plurality of irrigation tubes which are respectively parallel, the irrigation tubes do not lie all on the same side of the nonwoven textile web 3 but are also disposed on different sides, for example each second irrigation tube is at the top and each other irrigation tube is beneath the nonwoven textile web 3.

It is particularly advantageous for the irrigation mat or for the nonwoven textile web 3 if it weighs about 100 g/m2 to 1000 g/m2, in which case a nonwoven textile of about 200 g/m2 already achieves very results.

Insofar as reference is made in this application to capillarity or capillary capability, that is intended to denote the capillary property or the capillary effect of the nonwoven textile web, that is to say a textile material/a textile web. That property says something about how the water which penetrates into such a web is distributed by virtue of the capillary property itself and as uniformly as possible (similarly to an osmosis effect).

As mentioned it is also possible for the nonwoven textile web 3 to comprise two or more mutually superposed nonwoven textile webs, in which case they are in turn sewn or quilted together by means of a needling machine or the like, or at any event joined together, and the uppermost layer is formed from a fibrous web consisting of natural fibers, wherein the needling is missing where the irrigation tube is placed thereon.

If two nonwoven textiles are placed one over the other and they are ultimately intended to form a nonwoven textile web, it is definitely advantageous if the upper nonwoven textile has a higher capillarity (capillary property) than the lower nonwoven textile so that the water overall is better distributed in respect of width and cannot seep so quickly downwardly into the ground.

It would therefore also be in accordance with the disclosure for the nonwoven textile web 3 to comprise two or more nonwoven textile layers of different capillarity, wherein the irrigation tube is glued, sewn or in some other fashion fixed to one of the two sides.

It is however also possible for one of the (two) nonwoven textile layers to be provided with a pore film at the underside. That allows water and air to pass limitedly therethrough and once again the irrigation tubes are fitted to one of the two sides.

In all variants referred to hereinbefore and set forth hereinafter the irrigation tube or the drip tube can in turn be provided with a casing, but it is also possible to successfully carry the disclosure into effect without a casing.

In addition it is alternatively possible for one of the two nonwoven textile layers to be provided with a film or film strip at its underside, which do not allow any water therethrough.

In addition an alternative according to the disclosure is that of providing one of the two nonwoven textile layers with a nonwoven textile which is thermally fixed at the underside and which is limitedly water-permeable.

Although the irrigation mat is disclosed with reference to its preferred embodiment, the disclosure is not intended to be limited thereby. Rather, a skilled artisan will recognize from the disclosure herein a wide number of alternatives. Additionally, all publications, patents, and patent applications mentioned in this specification are herein incorporated by reference to the same extent as if each individual publication, patent, or patent application was specifically and individually indicated to be incorporated by reference.

As used herein, the phrase at least one of A, B, and C should be construed to mean a logical (A or B or C), using a non-exclusive logical or. It should be understood that steps within a method may be executed in different order without altering the principles of the present disclosure.

For all of the embodiments described above, the skilled artisan will recognize that any of the above-described methods can be carried out using any appropriate apparatus. Further, the disclosure herein of any particular feature in connection with an embodiment can be used in all other disclosed embodiments set forth herein.

What is claimed is:

1. An irrigation mat comprising:
   only one nonwoven textile web including capillary action for moisture, water or other solution; and
   at least one irrigation tube including openings for the outlet of said moisture, water or other solution, wherein the irrigation tube is fixed to the nonwoven textile web; and an attachment positioned between the web and the tube securing the tube in relation to the web;
   wherein the web is positioned entirely above or entirely below the at least one irrigation tube when the irrigation mat is installed.

2. The irrigation mat according to claim 1 comprising a casing bearing tightly proximate the tube.

3. The irrigation mat according to claim 1 wherein the irrigation tube is glued to the nonwoven textile web.

4. The irrigation mat according to claim 1 wherein the irrigation tube is fixed by stitching to the nonwoven textile web by a mesh which is fixed to the nonwoven textile web.

5. The irrigation mat according to claim 1 wherein the irrigation tube is fixed on the nonwoven textile web by an adhesive strip.

6. The irrigation mat according to claim 2 wherein the casing is fixed to the nonwoven textile web by gluing, stitching, or other fixing mechanisms.

7. The irrigation mat according claim 1 wherein the nonwoven textile web weighs about 100 g/m2 to about 1000 g/m2.

8. The irrigation mat according claim 7 wherein the nonwoven textile web weighs about 200 g/m2.

9. The irrigation mat according claim 2 wherein when the casing is fixed to the nonwoven textile web by gluing, two adhesive strips provided in the longitudinal direction of the tube are formed, between which a strip of nonwoven textile web remains free for improved discharge of the water from the casing into the nonwoven textile web.

10. An irrigation mat comprising:
    not more than one nonwoven textile web having capillary action for distributing moisture evenly throughout the textile web; and
    a plurality of irrigation tubes, each irrigation tube of the plurality including perforations to provide moisture to the single nonwoven textile web, the plurality of irrigation tubes being fixed in position with respect to the single nonwoven textile web through use of an attachment positioned between the plurality of irrigation tubes and the single nonwoven textile web, and each irrigation tube of the plurality aligned in parallel with the other one or more tubes of the plurality;
    wherein the web is positioned entirely above or entirely below the plurality of irrigation tubes when the irrigation mat is installed.

11. The irrigation mat according to claim 10 comprising a casing completely surrounding a circumferential section of at least one of the plurality of irrigation tubes, the casing bearing tightly proximate the circumferential section of the tube.

12. The irrigation mat according to claim 10 wherein the plurality of irrigation tubes are glued to the nonwoven textile web.

13. The irrigation mat according to claim 11 wherein the casing is fixed on the nonwoven textile web by a plurality of adhesive strips.

14. The irrigation mat according to claim 11 wherein the casing is fixed to the nonwoven textile web by gluing, stitching, or other fixing mechanisms.

15. The irrigation mat according claim 10 wherein the nonwoven textile web weighs about 100 g/m2 to about 1000 g/m2.

16. The irrigation mat according claim 15 wherein the nonwoven textile web weighs about 200 g/m2.

17. The irrigation mat according to claim 2, wherein the nonwoven textile web is configured to evenly distribute moisture across an area of coverage of the textile web from the at least one irrigation tube.

18. An irrigation mat comprising:
one or more irrigation tubes, each irrigation tube having:
an annular wall with a first end and a second end; and
a plurality of holes through the annular wall between the first end and the second end; and
a web assembly consisting of only one textile web positioned either entirely above one or more of the one or more irrigation tubes or entirely below one or more of the one or more irrigation tubes when the irrigation mat is installed, wherein the web assembly is fixed with respect to the one or more irrigation tubes through use of an attachment positioned between the web assembly and the one or more irrigation tubes.

19. The irrigation mat of claim 1, wherein the nonwoven textile web is planar when the irrigation mat is set upon a flat surface.

20. The irrigation mat of claim 10, wherein the nonwoven textile web is planar when the irrigation mat is set upon a flat surface.

* * * * *